(12) United States Patent
Hara

(10) Patent No.: US 7,900,077 B2
(45) Date of Patent: *Mar. 1, 2011

(54) POWER SUPPLYING METHOD AND APPARATUS AND A SYSTEM USING THE SAME

(75) Inventor: Kentaroh Hara, Osaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 12/133,152

(22) Filed: Jun. 4, 2008

(65) Prior Publication Data

US 2008/0244310 A1   Oct. 2, 2008

Related U.S. Application Data

(63) Continuation of application No. 11/125,487, filed on May 10, 2005, now Pat. No. 7,401,237.

(30) Foreign Application Priority Data

May 11, 2004   (JP) .............................. 2004-141206

(51) Int. Cl.
*G06F 1/00* (2006.01)
*G06F 11/30* (2006.01)

(52) U.S. Cl. ...................... 713/340; 713/300; 324/522; 361/1; 361/88

(58) Field of Classification Search ................. 713/300, 713/340; 361/1, 88; 324/522
See application file for complete search history.

(56) References Cited

U.S. PATENT DOCUMENTS

| 4,685,020 | A | | 8/1987 | Driscoll et al. |
| 5,122,726 | A | * | 6/1992 | Elliott et al. ................ 323/272 |
| 5,150,286 | A | | 9/1992 | Venditto et al. |
| 5,179,493 | A | * | 1/1993 | Imanishi .................... 361/91.1 |
| 5,416,689 | A | | 5/1995 | Silverstein et al. |
| 5,559,376 | A | | 9/1996 | Tachikawa |
| 5,672,917 | A | | 9/1997 | Nakano |
| 5,691,630 | A | | 11/1997 | Chosa |
| 5,710,691 | A | | 1/1998 | Fowler et al. |

(Continued)

FOREIGN PATENT DOCUMENTS

JP   3-55608   3/1991

(Continued)

*Primary Examiner*—Chun Cao
*Assistant Examiner*—Jaweed A Abbaszadeh
(74) *Attorney, Agent, or Firm*—Cooper & Dunham LLP

(57) ABSTRACT

An apparatus includes at least one load, a control circuit, and a power supplying apparatus including a control-use power supply part, at least one load-use power supply part, and a power supply control part. The control-use power supply part supplies first electric power to the control circuit, and stops supplying the first electric power and outputs a first detection signal when detecting a first abnormal operation state. The at least one load-use power supply part supplies second electric power to the respective at least one load, and stops supplying the second electric power and outputs a second detection signal when detecting a second abnormal operation state. The power supply control part causes the control-use power supply part to stop supplying the first electric power according to the first detection signal, and causes the at least one load-use power supply part to stop supplying the second electric power according to the second detection signal.

12 Claims, 3 Drawing Sheets

U.S. PATENT DOCUMENTS

| | | | |
|---|---|---|---|
| 5,745,670 | A | 4/1998 | Linde |
| 6,366,068 | B1 | 4/2002 | Morishita |
| 6,366,475 | B2 | 4/2002 | Nakazawa et al. |
| 6,650,099 | B2 | 11/2003 | Mitamura et al. |
| 6,815,843 | B1 | 11/2004 | Kageyama |
| 6,903,945 | B2 | 6/2005 | Kitano |
| 7,129,681 | B2 | 10/2006 | Fujii |
| 7,212,954 | B2 | 5/2007 | Amano |
| 7,312,962 | B1 * | 12/2007 | Zansky et al. ............... 361/30 |
| 2003/0177404 | A1 | 9/2003 | Jorgenson et al. |
| 2004/0105198 | A1 | 6/2004 | Fujii |
| 2004/0148060 | A1 | 7/2004 | Lee |
| 2004/0228058 | A1 | 11/2004 | Mayama et al. |
| 2005/0240814 | A1 | 10/2005 | Sasakura et al. |

FOREIGN PATENT DOCUMENTS

| | | |
|---|---|---|
| JP | 5-56632 | 3/1993 |
| JP | 2000-308332 | 11/2000 |
| JP | 2003-134808 | 5/2003 |
| JP | 2003-218684 | 7/2003 |
| JP | 2003-224976 | 8/2003 |
| JP | 2004-23990 | 1/2004 |

* cited by examiner

POWER SUPPLYING METHOD AND APPARATUS AND A SYSTEM USING THE SAME

CROSS-REFERENCE TO RELATED APPLICATION

This application is a Rule 1.53(b) continuation of Ser. No. 11/125,487, filed May 10, 2005, now U.S. Pat. No. 7,401,237, the entire contents of which are incorporated herein by reference.

BACKGROUND

FIELD

This patent specification relates to a power supplying method and apparatus, and more particularly to a power supplying method and apparatus capable of independently supplying a plurality of electric powers to respective function blocks so that, even when a problem occurs in a load or a control circuit including a CPU (central processing unit), functions relying on other electric powers that normally operate can be used as safely as possible. The patent specification further relates to a system using the power supplying method and apparatus.

DISCUSSION OF THE BACKGROUND

In recent years, digital mobile equipment such as mobile phones, digital cameras, PDAs (personal digital assistance), etc., has been provided with diverse functions. With this diversity of functions, the power supply to the functions has been required to have diverse performances and specifications. As a result, such digital mobile equipment requires a power supply circuit which supplies different kinds of electric powers having different output voltages or current capacities.

FIG. 1 illustrates a power supply circuit which supplies different kinds of electric powers and its protection circuit described in Japanese Laid-Open Patent Publication No. 2000-308332.

A power supply circuit 100 of FIG. 1 includes switching regulators 101A to 101C and a short-circuit information circuit 102. The power supply circuit 100 is connected to a load 111 and a battery 110 which is a direct-current power source. The switching regulators 101A to 101C generate and output respective predetermined voltages based on a voltage applied by the battery 110 to the load 111. Each of the switching regulators 101A to 101C has a short-circuit protection circuit (not illustrated). According to short-circuit detection signals S1 to S3 output from the switching regulators 101A to 101C, respectively, the short-circuit information circuit 102 sends a short-circuit activation signal S4 to the switching regulators 101A to 101C for causing the switching regulators 101A to 101C to perform predetermined short-circuit operations.

Each of the switching regulators 101A to 101C outputs one of the short-circuit detection signals S1 to S3 to the short-circuit information circuit 102 when its own short-circuit protection circuit monitors a corresponding power supply channel and detects an occurrence of short circuit in the power supply channel. For example, when a short circuit occurs in a power supply channel of the switching regulator 101A, a short-circuit protection circuit which protects a control IC (integrated circuit) provided in the switching regulator 101A detects the short circuit and outputs the short-circuit detection signal S1 to the short-circuit information circuit 102. Upon receipt of the short-circuit detection signal S1 input from the switching regulator 101A, the short-circuit information circuit 102 outputs the short-circuit activation signal S4 to each of the switching regulators 101A to 101C.

Upon receipt of the short-circuit activation signal S4 input from the short-circuit information circuit 102, all of the power supply channels controlled by the switching regulators 101A to 101C are subjected to short-circuit protection. For example, all of the power supply channels are brought into a power-off state in which electric supply to the load 111 is stopped. Therefore, when one of the switching regulators 101A to 101C detects the short circuit, the switching regulators 101A to 101C are placed into a predetermined short-circuit protection state, e.g., into a power-off state in which all of electric supplies to the load 110 are stopped.

In this manner, when any abnormal operation such as the short circuit is detected in the switching regulators 101A to 101C, the background power supply circuit 100 protects the switching regulators 101A to 101C and the load 111 by placing the switching regulators 101A to 101C into the power-off state to stop all electric supplies to the load 110.

As described above, in digital mobile equipment including a power supply circuit which supplies a plurality of electric powers by using a battery as a power supply, a control circuit including a CPU for controlling the equipment performs a control operation to extend a battery life by placing a circuit of a temporarily unused function into a stand-by state or by stopping electric supply to the circuit. In this manner, electric supplies to the plurality of power supply circuits are frequently performed or stopped by the control circuit in the equipment.

As in the above case, if all of the electric supplies are stopped upon detection of the abnormal operation by one of the power supply circuits, however, other functions including a protective operation function connected to other normally-operating power supply circuits also become unusable.

SUMMARY

This patent specification describes novel techniques for power supplying.

In one example, a novel system includes at least one load, a control circuit, and a power supplying apparatus. The at least one load is configured to perform a predetermined function. The control circuit is configured to control an operation of the at least one load. The power supplying apparatus includes a control-use power supply part, at least one load-use power supply part, and a power supply control part. The control-use power supply part is configured to supply first electric power to the control circuit, to detect a first abnormal operation state, and to stop supplying the first electric power and to output a first abnormality detection signal upon detection of the first abnormal operation state. The at least one load-use power supply part is configured to supply second electric power to the respective at least one load, to detect a second abnormal operation state, and to stop supplying the second electric power and to output a second abnormality detection signal upon detection of the second abnormal operation state. The power supply control part is configured to cause the control-use power supply part to stop supplying the first electric power upon receipt of the first abnormality detection signal, and to cause the at least one load-use power supply part to stop supplying the second electric power upon receipt of the second abnormality detection signal.

In another example, a novel system includes at least one load, a control circuit, and a power supplying apparatus. The at least one load is configured to perform a predetermined function. The control circuit is configured to control an operation of the at least one load. The power supplying apparatus includes a control-use power supply part, at least one load-use power supply part, and a power supply control part. The control-use power supply part is configured to supply first electric power to the control circuit, to detect a first abnormal operation state, and to stop supplying the first electric power and to output a first abnormality detection signal upon detection of the first abnormal operation state. The at least one load-use power supply part is configured to supply second electric power to the respective at least one load, to detect a second abnormal operation state, and to stop supplying the second electric power and to output a second abnormality detection signal upon detection of the second abnormal operation state. The power supply control part is configured to cause the at least one load-use power supply part to stop supplying the second electric power to the respective at least one load and to cause the control-use power supply part to enter into a sleep mode upon receipt of the first abnormality detection signal, and to cause one of the at least one load-use power supply part to enter into a sleep mode upon receipt of the second abnormality detection signal.

In the system, the control-use power supply part may output the first abnormality detection signal when continuously detecting the first abnormal operation state for at least a first predetermined time, and the at least one load-use power supply part may output the second abnormality detection signal when continuously detecting the second abnormal operation state for at least the first predetermined time.

In the system, the power supply control part may cause the control-use power supply part to resume supplying the first electric power upon elapse of a second predetermined time after receipt of the first abnormality detection signal, and the power supply control part may cause the at least one load-use power supply part to resume supplying the second electric power upon elapse of the second predetermined time after receipt of the second abnormality detection signal.

In the system, the first abnormal operation state may be an overcurrent state in which a first output current output from the control-use power supply part exceeds a first predetermined value, and the second abnormal operation state may be another overcurrent state in which a second output current output from the at least one load-use power supply part exceeds a second predetermined value.

In the system, each of the control-use power supply part and the at least one load-use power supply part may include a switching regulator.

In the system, at least one of the at least one load may include an output power amplifier.

The system may further include a bias voltage generation part configured to supply a predetermined bias voltage to the output power amplifier. The power supply control part may stop an operation of the bias voltage generation part upon receipt of the second abnormality detection signal output from the at least one load-use power supply part which supplies third electric power to the output power amplifier.

In the system, the control-use power supply part, the at least one load-use power supply part, the power supply control part, and the bias voltage generation part may be integrated into a semiconductor device of a single chip.

Thus, in a novel system for power supplying, according to an exemplary embodiment, means is provided for stopping supply of electric power from a load-use power supply circuit to an associated load if the load-use power supply circuit detects an abnormal state, while electric supplies from other load-use power supply circuits are allowed to continue.

Accordingly, functions other than a function of the load associated with the load-use power supply circuit continue to be usable.

This patent specification further describes a novel power supplying method for supplying a plurality of electric powers to respective function blocks. In one example, a novel power supplying method for supplying a plurality of electric powers to respective function blocks includes: providing at least one load configured to perform a predetermined function, a control circuit configured to control an operation of the at least one load, and a power supplying apparatus; providing the power supplying apparatus with a control-use power supply part, at least one load-use power supply part, and a power supply control part; causing the control-use power supply part to supply first electric power to the control circuit; causing the control-use power supply part to detect a first abnormal operation state; causing the control-use power supply part to stop supplying the first electric power and to output a first abnormality detection signal upon detection of the first abnormal operation state; causing the at least one load-use power supply part to supply second electric power to the respective at least one load; causing the at least one load-use power supply part to detect a second abnormal operation state; causing the at least one load-use power supply part to stop supplying the second electric power and to output a second abnormality detection signal upon detection of the second abnormal operation state; causing the power supply control part to control the at least one load-use power supply part to stop supplying the second electric power to the respective at least one load and to control the control-use power supply part to enter into a sleep mode upon receipt of the first abnormality detection signal; and causing one of the at least one load-use power supply part to enter into a sleep mode upon receipt of the second abnormality detection signal.

The power supplying method may further include: causing the control-use power supply part to output the first abnormality detection signal when continuously detecting the first abnormal operation state for at least a first predetermined time; and causing the at least one load-use power supply part to output the second abnormality detection signal when continuously detecting the second abnormal operation state for at least the first predetermined time.

The power supplying method may further include: causing the power supply control part to control the control-use power supply part to resume supplying the first electric power upon elapse of a second predetermined time after receipt of the first abnormality detection signal; and causing the power supply control part to control the at least one load-use power supply part to resume supplying the second electric power upon elapse of the second predetermined time after receipt of the second abnormality detection signal.

In the power supplying method, the first abnormal operation state may be an overcurrent state in which a first output current output from the control-use power supply part exceeds a first predetermined value, and the second abnormal operation state may be another overcurrent state in which a second output current output from the at least one load-use power supply part exceeds a second predetermined value.

The power supplying method may further include including a switching regulator in each of the control-use power supply part and the at least one load-use power supply part.

The power supplying method may further include including an output power amplifier in at least one of the at least one load.

The power supplying method may further include: providing a bias voltage generation part configured to supply a predetermined bias voltage to the output power amplifier; and causing the power supply control part to stop an operation of the bias voltage generation part upon receipt of the second abnormality detection signal output from the at least one load-use power supply part which supplies third electric power to the output power amplifier.

The power supplying method may further include integrating the control-use power supply part, the at least one load-use power supply part, the power supply control part, and the bias voltage generation part into a semiconductor device of a single chip.

This patent specification further describes a novel mobile phone. In one example, a novel mobile phone includes at least one load, a control circuit, and a power supplying apparatus. The at least one load is configured to perform a predetermined function. The control circuit is configured to control an operation of the at least one load. The power supplying apparatus includes a control-use power supply part, at least one load-use power supply part, and a power supply control part. The control-use power supply part is configured to supply first electric power to the control circuit, to detect a first abnormal operation state, and to stop supplying the first electric power and to output a first abnormality detection signal upon detection of the first abnormal operation state. The at least one load-use power supply part is configured to supply second electric power to the respective at least one load, to detect a second abnormal operation state, and to stop supplying the second electric power and to output a second abnormality detection signal upon detection of the second abnormal operation state. The power supply control part is configured to cause the control-use power supply part to stop supplying the first electric power upon receipt of the first abnormality detection signal, and to cause the at least one load-use power supply part to stop supplying the second electric power upon receipt of the second abnormality detection signal.

This patent specification further describes a novel power supplying apparatus for supplying electric power to at least one load performing a predetermined function and a control circuit controlling an operation of the at least one load. In one example, a novel power supplying apparatus for supplying electric power to at least one load performing a predetermined function and a control circuit controlling an operation of the at least one load includes a control-use power supply part, at least one load-use power supply part, and a power supply control part. The control-use power supply part is configured to supply first electric power to the control circuit, to detect a first abnormal operation state, and to stop supplying the first electric power and to output a first abnormality detection signal upon detection of the first abnormal operation state. The at least one load-use power supply part is configured to supply second electric power to the respective at least one load, to detect a second abnormal operation state, and to stop supplying the second electric power and to output a second abnormality detection signal upon detection of the second abnormal operation state. The power supply control part is configured to cause the at least one load-use power supply part to stop supplying the second electric power to the respective at least one load and to cause the control-use power supply part to enter into a sleep mode upon receipt of the first abnormality detection signal, and to cause one of the at least one load-use power supply part to enter into a sleep mode upon receipt of the second abnormality detection signal.

BRIEF DESCRIPTION OF THE DRAWINGS

A more complete appreciation of the disclosure and many of the advantages thereof are readily obtained as the same becomes better understood by reference to the following detailed description when considered in connection with the accompanying drawings, wherein.

DETAILED DESCRIPTION OF PREFERRED EMBODIMENTS

Figure 1:
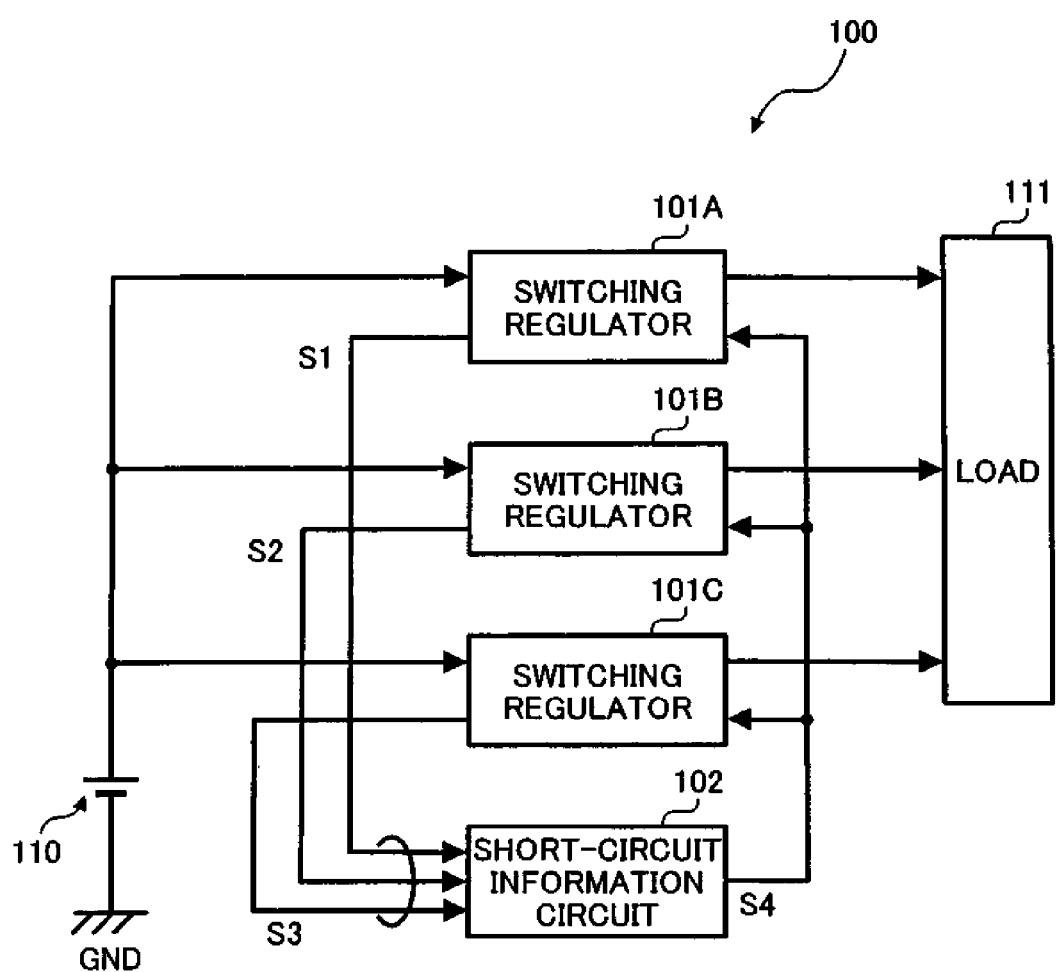
FIG. 1 is a circuit diagram illustrating a configuration of a background power supply circuit.

In describing preferred embodiments illustrated in the drawings, specific terminology is employed for the purpose of clarity. However, the disclosure of this patent specification is not intended to be limited to the specific terminology so used and it is to be understood that substitutions for each specific element can include any technical equivalents that operate in a similar manner.

Figure 2:
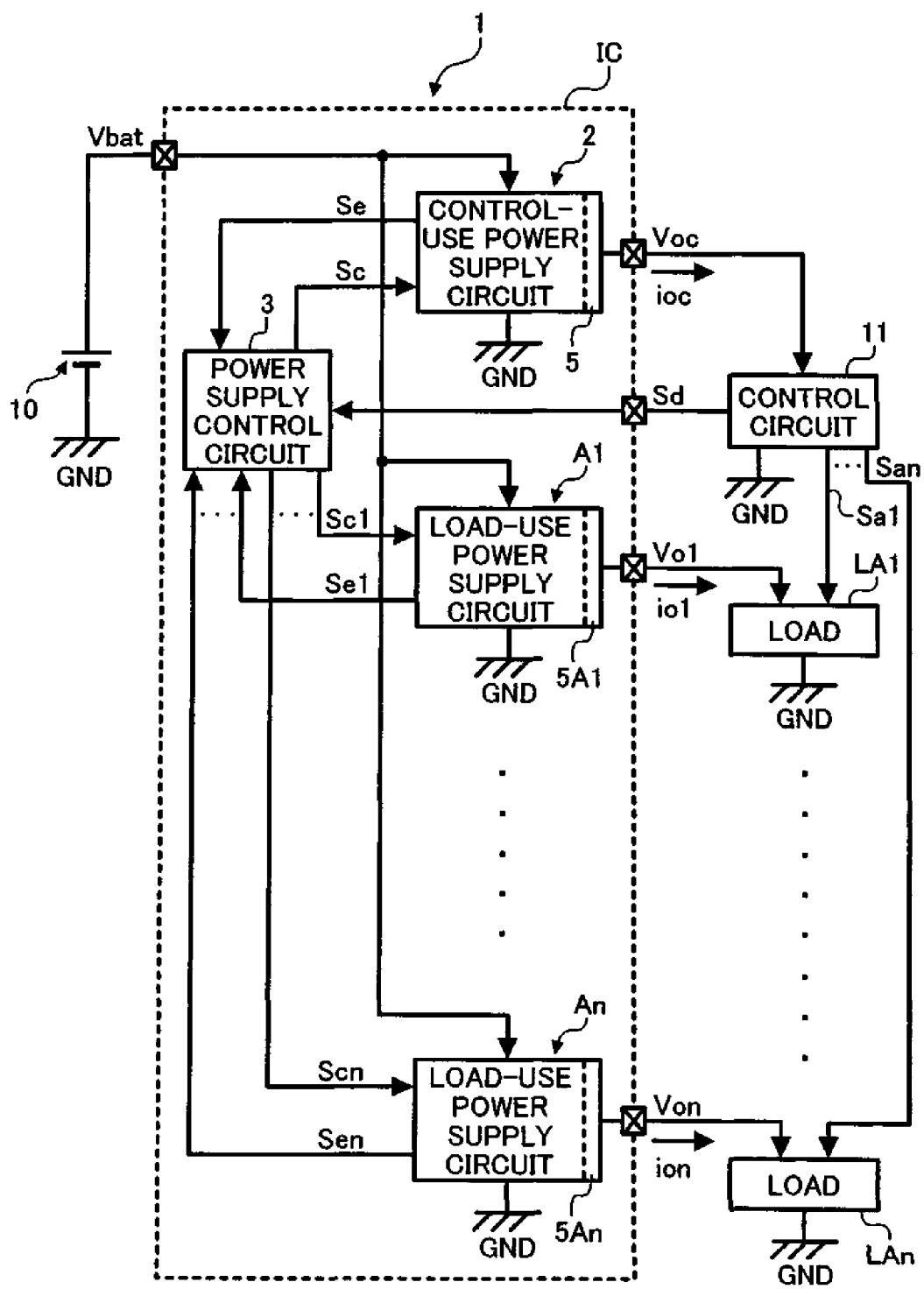
FIG. 2 is a circuit diagram illustrating a configuration of a power supply circuit according to an embodiment.

Referring now to the drawings, wherein like reference numerals designate identical or corresponding parts throughout the several views, more particularly to FIG. 2, an exemplary configuration of a power supply circuit according to an embodiment is described.

The power supply circuit 1 of FIG. 2 includes a control-use power supply circuit 2, a power supply control circuit 3, and load-use power supply circuits A1 to An (n indicates an integer number larger than 1). The control-use power supply circuit 2 includes an overcurrent protection circuit 5, and the load-use power supply circuits A1 to An include corresponding overcurrent protection circuits 5A1 to 5An, respectively. The power supply circuit 1 is connected to a battery 10, a control circuit 11, and loads LA1 to LAn.

The power supply circuit 1 generates predetermined voltages Voc and Vo1 to Von based on a power supply voltage Vbat input from the battery 10, which is a direct-current power supply. Then, the power supply circuit 1 supplies the predetermined voltage Voc to the control circuit 11 which includes a CPU, and the predetermined voltages Vo1 to Von to the corresponding loads LA1 to LAn.

The control-use power supply circuit 2 is formed by a switching regulator, for example, and generates and outputs the voltage Voc to the control circuit 11. The load-use power supply circuits A1 to An are respectively formed by switching regulators, for example, and generate and output the corresponding voltages Vo1 to Von to the corresponding loads LA1 to LAn, respectively. The power supply control circuit 3 controls operations of the control-use power supply circuit 2 and the load-use power supply circuits A1 to An.

The control-use power supply circuit 2 forms a control-use power supply part, the load-use power supply circuits A1 to An form a load-use power supply part, and the power supply control circuit 3 forms a power supply control part. The control-use power supply circuit 2, the load-use power supply circuits A1 to An, and the power supply control circuit 3 are integrated into a single semiconductor IC of a single chip.

The power supply control circuit 3 generates and outputs a control-use power supply control signal Sc to the control-use power supply circuit 2 to control an operation of the control-use power supply circuit 2. Further, the power supply control circuit 3 generates and outputs load-use power supply control signals Sc1 to Scn to the corresponding load-use power supply circuits A1 to An to control operations of the load-use power supply circuits A1 to An.

The control-use power supply circuit 2 and the load-use power supply circuits A1 to An are respectively provided with the overcurrent protection circuits 5 and 5A1 to 5An, which detect an abnormal state of respective output currents to protect the control-use power supply circuit 2 and the load-use power supply circuits A1 to An.

The overcurrent protection circuit 5 included in the control-use power supply circuit 2 detects an overcurrent state in which an output current ioc output from the control-use power supply circuit 2 exceeds a predetermined current value due to such factors as the short circuit. If the overcurrent state continues for a predetermined time T1, which may be two milliseconds, for example, the control-use power supply circuit 2 stops supplying electric power to the control circuit 11 and outputs a predetermined control abnormality detection signal Se to the power supply control circuit 3. Since the load-use power supply circuits A1 to An have similar circuit configurations, the following description is made on a given load-use power supply circuit Ak, as one example. In this case, k of Ak is an integer number equal to or larger than 1. An overcurrent protection circuit 5Ak included in the load-use power supply circuit Ak detects an overcurrent state in which an output current iok output from the load-use power supply circuit Ak exceeds a predetermined current value due to such factors as the short circuit. If the overcurrent state continues for a predetermined time T1, which may be two milliseconds, for example, the load-use power supply circuit Ak stops supplying electric power to the corresponding load LAk and outputs a predetermined load abnormality detection signal Sek to the power supply control circuit 3.

The control circuit 11 outputs a control signal Sd to the power supply control circuit 3 to cause the power supply control circuit 3 to control operations of the load-use power supply circuits A1 to An. In accordance with the received control signal Sd, the power supply control circuit 3 outputs the load-use power supply control signals Sc1 to Scn to the corresponding load-use power supply circuits A1 to An so as to cause the load-use power supply circuits A1 to An to supply electric powers or stop supplying electric powers to the loads LA1 to LAn. Further, the control circuit 11 outputs load control signals Sa1 to San to the loads LA1 to Lan to operate or stop operation of the loads LA1 to LAn. Then, the loads LA1 to LAn respectively perform operations in accordance with the received load control signal Sa1 to San.

The power supply control circuit 3 included in the power supply circuit 1 thus configured is described more in detail.

If any problem occurs in the load LAk and the overcurrent protection circuit SAk included in the load-use power supply circuit Ak is operated, the overcurrent protection circuit 5Ak latches the overcurrent state, causes the load-use power supply circuit Ak to stop supplying electric power to the load LAk, and outputs the load abnormality detection signal Sek to the power supply control circuit 3 to notify occurrence of the abnormal state. Upon receipt of the load abnormality detection signal Sek indicating the occurrence of the abnormal state, the power supply control circuit 3 stands by for a predetermined time Ta, which may be sixteen milliseconds, for example. Thereafter, the power supply control circuit 3 outputs a predetermined load-use power supply control signal Sck to place the load-use power supply circuit Ak into a sleep state in which an amount of consumption current is reduced.

Furthermore, after elapse of a predetermined time Tb, which may be two milliseconds, for example, since the power supply control circuit 3 has placed the load-use power supply circuit Ak into the sleep state, the power supply control circuit 3 terminates the sleep state of the load-use power supply circuit Ak to start electric supply to the load LAk, so that an automatic return operation of the load-use power supply circuit Ak is performed to restore a function of the load LAk. In the present case, a time obtained by adding the predetermined time Tb to the predetermined time Ta is a predetermined time T2. If the overcurrent protection circuit 5Ak of the load-use power supply circuit Ak is again operated in this case, however, the power supply control circuit 3 repeats the automatic return operation of the load-use power supply circuit Ak.

As described above, when the overcurrent protection circuit 5Ak included in the load-use power supply circuit Ak is operated, the electric supply from the load-use power supply circuit Ak is stopped but electric supplies from other load-use power supply circuits are continued. Accordingly, other functions than a function of the load LAk continues to be usable.

If a problem occurs in the control circuit 11, and if the overcurrent protection circuit 5 included in the control-use power supply circuit 2 detects the overcurrent state and outputs the predetermined control abnormality detection signal Se to the power supply control circuit 3, the overcurrent protection circuit 5 latches the overcurrent state. Then, the control-use power supply circuit 2 stops supplying electric power to the control circuit 11 and outputs the control abnormality detection signal Se to the power supply control circuit 3 to notify occurrence of the abnormal state. Upon receipt of the control abnormality detection signal Se indicating the occurrence of the abnormal state, the power supply control circuit 3 immediately outputs the load-use power supply control signals Sc1 to Scn to the load-use power supply circuits A1 to An to cause the load-use power supply circuits A1 to An to stop supplying electric powers to the corresponding loads LA1 to LAn. Thereafter, the power supply control circuit 3 stands by for the predetermined time Ta, which may be 16 milliseconds, for example, and then outputs a predetermined control-use power supply control signal Sc to place the control-use power supply circuit 2 into a sleep state.

Further, after elapse of the predetermined time Tb, which may be 2 milliseconds, for example, since the power supply control circuit 3 has placed the control-use power supply circuit 2 into the sleep state, the power supply control circuit 3 terminates the sleep state of the control-use power supply circuit 2, to start electric supply to the control circuit 11, and cause the control-use power supply circuit 2 to perform an automatic return operation to restore a function of the control circuit 11. If the overcurrent protection circuit 5 included in the control-use power supply circuit 2 is again operated in this case, however, the power supply control circuit 3 repeats the automatic return operation of the power supply circuit 2. If the problem found in the control circuit 11 has been resolved at the time of the automatic return operation and the overcurrent protection circuit 5 of the control-use power supply circuit 2 stops operation, the power supply control circuit 3 does not receive the control abnormality detection signal Se. Therefore, the power supply control circuit 3 outputs the load-use power supply control signals Sc1 to Scn to place all of the load-use power supply circuits A1 to An into an operating state.

Figure 3:
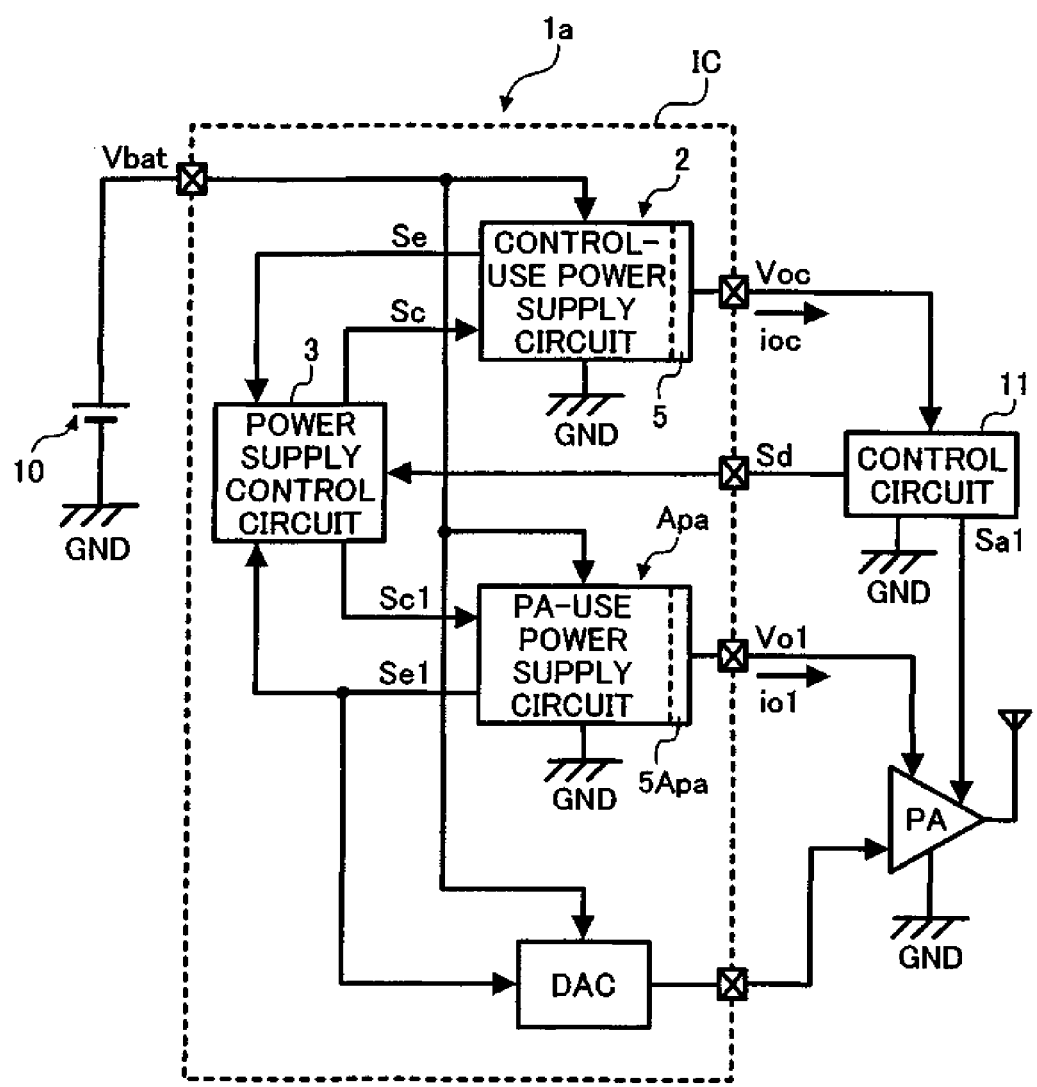
FIG. 3 is a circuit diagram illustrating a configuration of a power supply circuit according to another embodiment, as used in a mobile phone.

With reference to FIG. 3, description is made on a power supply circuit la according to another embodiment, which is used in a mobile phone. The power supply circuit 1*a* includes the control-use power supply circuit 2, the power supply control circuit 3, a PA (power amplifier)-use power supply circuit Apa, and a digital-to-analog converter DAC. The control-use power supply circuit 2 includes the overcurrent protection circuit 5, and the PA-use power supply circuit Apa includes an overcurrent protection circuit 5Apa. The power supply circuit la is connected to the battery 10, the control circuit 11, and an output power amplifier PA.

In the following, description is omitted for components shown in FIG. 3 which are also components shown in FIG. 2, and differences between the circuit configuration of FIG. 2 and the circuit configuration of FIG. 3 are described. Further, the following description is made on an assumption that n of the load-use power supply circuit An and the load LAn in FIG. 2 is set to be 1, for example.

The differences between FIGS. 2 and 3 are as follows. First, the load LA1 of FIG. 2 is replaced by the output power amplifier PA in FIG. 3. Secondly, the load-use power supply circuit A1 of FIG. 2 is replaced by the PA-use power supply circuit Apa in FIG. 3. Thirdly, FIG. 3 additionally includes the digital-to-analog converter DAC which generates a bias voltage to be applied to the output power amplifier PA.

In FIG. 3, the power supply circuit 1a generates the predetermined voltages Voc and Vo1 based on the power supply voltage Vbat input from the battery 10. Then, the power supply circuit 1a supplies the generated predetermined voltage Voc to the control circuit 11 including the CPU. Further, the power supply circuit 1a supplies the predetermined voltage Vo1 to the output power amplifier PA, operation of which is controlled by the control circuit 11.

The PA-use power supply circuit Apa, which is formed by a switching regulator, for example, generates and outputs the predetermined voltage Vo1. The power supply control circuit 3 controls operations of the control-use power supply circuit 2 and the PA-use power supply circuit Apa. The digital-to-analog converter DAC supplies a predetermined bias voltage to the output power amplifier PA. Configuration and operation of the PA-use power supply circuit Apa of FIG. 3 is similar to configuration and operation of the load-use power supply circuit A1 of FIG. 2. Further, the PA-use power supply circuit Apa forms the load-use power supply part, and the digital-to-analog converter DAC forms a bias voltage generation part. The control-use power supply circuit 2, the PA-use power supply circuit Apa, the power supply control circuit 3, and the digital-to-analog converter DAC are integrated into a single semiconductor IC a single chip.

In this circuit configuration of FIG. 3, if the output power amplifier PA fails to properly operate and thus the output current io1 output from the PA-use power supply circuit Apa is increased to operate the overcurrent protection circuit 5Apa included in the PA-use power supply circuit Apa, the overcurrent protection circuit 5Apa latches the overcurrent state and stops electric supply from the PA-use power supply circuit Apa. As a result, the PA-use power supply circuit Apa stops electric supply to the output power amplifier PA, and outputs a predetermined load abnormality detection signal Se1 to the power supply control circuit 3. Upon receipt of the predetermined load abnormality detection signal Se1, the power supply control circuit 3 performs an automatic return operation of the PA-use power supply circuit Apa to cause the PA-use power supply circuit Apa to start supplying electric power to the output power amplifier PA. When operation of the overcurrent protection circuit 5Apa of the PA-use power supply circuit Apa is resumed, the automatic return operation is repeated.

As described above, FIG. 3 illustrates an example in which n of the load-use power supply circuit An and the load LAn in FIG. 2 is set to be 1. If the power supply circuit 1a includes, other than the PA-use power supply circuit Apa, a load-use power supply circuit which supplies electric power to at least one load, then even when the electric supply from the PA-use power supply circuit Apa is stopped, electric supply from the load-use power supply circuit continues. Accordingly, it is possible to continue to use a function of any other load than the output power amplifier PA, such as a data receiving function of the mobile phone.

In FIG. 3, if the control circuit 11 fails to properly operate, and if the output current ioc output from the control-use power supply circuit 2 increases to operate the overcurrent protection circuit 5 provided in the control-use power supply circuit 2, the overcurrent protection circuit 5 latches the overcurrent state. As a result, the control-use power supply circuit 2 stops electric supply to the control circuit 11, and outputs the control abnormality detection signal Se to the power supply control circuit 3 to notify occurrence of the abnormal state. Upon receipt of the control abnormality detection signal Se indicating the occurrence of the abnormal state, the power supply control circuit 3 immediately outputs the load-use power supply control signal Sc1 to stop electric supply from the PA-use power supply circuit Apa to the output power amplifier PA. Thereafter, the power supply control circuit 3 performs the automatic return operation of the control-use power supply circuit 2. After the automatic return operation has been performed and the overcurrent protection circuit 5 of the control-use power supply circuit 2 stops operation, the power supply control circuit 3 outputs the control circuit power supply control signal Sc to place the control-use power supply circuit 2 into an operating state so as to cause the control-use power supply circuit 2 to supply electric power to the control circuit 11.

In this manner, if the control circuit 11 fails to properly operate, operation of the output power amplifier PA cannot be compensated. Therefore, electric supply from the PA-use power supply circuit Apa is stopped so that the output power amplifier PA does not improperly emit electric waves. Further, if the operation of the output power amplifier PA is stopped, the operation of the digital-to-analog converter DAC which supplies the bias voltage to the output power amplifier PA is also stopped. Accordingly, unnecessary electric consumption can be reduced. As described above, it is assumed in FIG. 3 that n of the load-use power supply circuit An and the load LAn in FIG. 2 is set to be 1, for example. If the power supply circuit 1a includes, other than the PA-use power supply circuit Apa, a load-use power supply circuit which supplies electric power to at least one load, the power supply control circuit 3 immediately stops electric supplies from the PA-use power supply circuit Apa and all of the load-use power supply circuits upon receipt of the control abnormality detection signal Se indicating the occurrence of the abnormal state.

As described above, in the power supply circuits according to the embodiments, if at least one of the overcurrent protection circuits provided in the corresponding load-use power supply circuits A1 to An detects an overcurrent, electric supply from the load-use power supply circuit in which the overcurrent is detected is stopped while allowing the other load-use power supply circuits to supply electric powers. Further, in the power supply circuits according to the embodiments, electric supplies from the control-use power supply circuit 2 and all of the load-use power supply circuits A1 to An are stopped upon detection of an overcurrent by the overcurrent protection circuit S of the control-use power supply circuit 2. Accordingly, even when a operational failure occurs in a system including the power supply circuit according to any of the embodiments, functions connected to normally-operating power supply circuits which are not affected by the operational failure can be safely used.

The above-described embodiments are illustrative, and numerous additional modifications and variations are possible in light of the above teachings. For example, elements and/or features of different illustrative and exemplary embodiments herein may be combined with each other and/or substituted for each other within the scope of this disclosure and appended claims. It is therefore to be understood that within the scope of the appended claims, the disclosure of this patent specification may be practiced otherwise than as specifically described herein.

This patent specification is based on Japanese patent application No. 2004-141206 filed on May 11, 2004 in the Japan Patent Office, the entire contents of which are incorporated by reference herein.

What is claimed is:

1. An electronic apparatus comprising:
   a plurality of loads consuming power to perform a predetermined function;
   a control circuit for controlling an operation of the plurality of loads;
   a control-use power supply circuit configured to supply a first power to the control circuit, detect a first abnormal operation state, and stop supplying the first power and output a first abnormality detection signal upon detection of the first abnormal operation state;
   a plurality of load-use power supply circuits each configured to supply a second power to each of said plurality of loads, respectively, detect a second abnormal operation state of any one of said load-use power supply circuits, and upon detection of the second abnormal operation state, output a second abnormality detection signal; and
   a power supply control circuit configured to cause said one of said load-use power supply circuits, in which the second abnormal operation state was detected, to stop supplying the second power to a corresponding load of said one of said load-use power supply circuits and cause others of said load-use power supply circuits to continue to supply the second power to respective ones of the loads, upon receipt of the second abnormality detection signal from said one of said load-use power supply circuits.

2. The electronic apparatus of claim 1, wherein said control-use power supply circuit includes an overcurrent protection circuit configured to detect an overcurrent state in which an output current of said control-use power supply circuit exceeds a predetermined value.

3. The electronic apparatus of claim 2, wherein said control-use power supply circuit stops supplying said first power to said control circuit and outputs said first abnormality detection signal, if the overcurrent state continues for a predetermined amount of time.

4. The electronic apparatus of claim 1, wherein at least one of said load-use power supply circuits includes an overcurrent protection circuit configured to detect an overcurrent state in which an output current of the load-use power supply circuit exceeds a predetermined value.

5. The electronic apparatus of claim 4, wherein the load-use power supply circuit stops supplying said second power to a corresponding load and outputs said second abnormality detection signal, if the overcurrent state continues for a predetermined amount of time.

6. An electronic apparatus comprising:
   at least one load consuming power to perform a predetermined function;
   a control circuit for controlling an operation of the at least one load;
   a control-use power supply circuit configured to supply first power to the control circuit, detect a first abnormal operation state, and upon detection of the first abnormal operation state, stop supplying said first power and output a first abnormality detection signal;
   a load-use power supply circuit configured to supply second power to the at least one load, detect a second abnormal operation state, and upon detection of the second abnormal operation state, stop supplying said second power and output a second abnormality detection signal; and
   a power supply control circuit configured to cause said load-use power supply circuit to stop supplying the second power to said at least one load and cause the control-use power supply circuit to enter into a sleep mode, upon receipt of the first abnormality detection signal, and upon receipt of the second abnormality detection signal, cause said load-use power supply circuit to enter into a sleep mode.

7. The electronic apparatus of claim 6, wherein said control-use power supply circuit includes an overcurrent protection circuit configured to detect an overcurrent state in which an output current of said control-use power supply circuit exceeds a predetermined value.

8. The electronic apparatus of claim 7, wherein said control-use power supply circuit stops supplying said first power to said control circuit and outputs said first abnormality detection signal, if the overcurrent state continues for a predetermined amount of time.

9. The electronic apparatus of claim 6, wherein at least one of said load-use power supply circuits includes an overcurrent protection circuit configured to detect an overcurrent state in which an output current of the load-use power supply circuit exceeds a predetermined value.

10. The electronic apparatus of claim 9, wherein the load-use power supply circuit stops supplying said second power to a corresponding load and outputs said second abnormality detection signal, if the overcurrent state continues for a predetermined amount of time.

11. The electronic apparatus of claim 1, wherein the power supply control circuit is further configured to cause only said one of said load-use power supply circuits, in which the second abnormal operation state was detected, to stop supplying the second power to said corresponding load of said one of said load-use power supply circuits and cause load-use power supply circuits other than said one of said load-use power supply circuits to continue to supply the second power to respective ones of the loads, upon receipt of the second abnormality detection signal from said one of said load-use power supply circuits.

12. The electronic apparatus of claim 1, wherein the power supply control circuit is configured such that the respective predetermined functions performed by the respective ones of the loads supplied with the second power by load-use power supply circuits other than said one of said load-use power supply circuits are not affected.

* * * * *